(12) United States Patent
Bringewatt et al.

(10) Patent No.: US 12,012,289 B2
(45) Date of Patent: Jun. 18, 2024

(54) METHOD FOR GRIPPING TEXTILE ITEMS

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 663 days.

(21) Appl. No.: 17/208,000

(22) Filed: Mar. 22, 2021

(65) Prior Publication Data

US 2021/0300687 A1    Sep. 30, 2021

(30) Foreign Application Priority Data

Mar. 27, 2020 (DE) .......................... 102020001961.7

(51) Int. Cl.
*B65G 47/04* (2006.01)
*D06F 67/04* (2006.01)

(52) U.S. Cl.
CPC ............. *B65G 47/04* (2013.01); *D06F 67/04* (2013.01); *B65G 2201/0229* (2013.01); *B65G 2203/041* (2013.01)

(58) Field of Classification Search
CPC ............ B65G 47/04; B65G 2201/0229; B65G 2203/041; D06F 67/04
See application file for complete search history.

(56) References Cited

U.S. PATENT DOCUMENTS

| | | | |
|---|---|---|---|
| 9,230,329 B2 | 1/2016 | Lukka | |
| 2010/0274390 A1* | 10/2010 | Walser | B25J 9/1697 700/259 |

(Continued)

FOREIGN PATENT DOCUMENTS

| | | |
|---|---|---|
| DE | 102014017477 A1 | 6/2016 |
| DE | 102014017478 A1 | 6/2016 |

(Continued)

OTHER PUBLICATIONS

Deutsches Patent-Und Markenamt (German Patent and Trademark Office), Recherchebericht (search in priority application), Nov. 13, 2020.

(Continued)

*Primary Examiner* — Abby Y Lin
*Assistant Examiner* — Dylan M Katz
(74) *Attorney, Agent, or Firm* — Laurence P. Colton; Smith Tempel Blaha LLC

(57) ABSTRACT

Laundry pieces are to be gripped at various locations in laundries. This is labor-intensive. For this purpose, efforts are being made toward automating the gripping of laundry pieces. A camera has previously been used for this purpose. The automatic gripping of laundry pieces is implemented by way of a plurality of cameras, in that a plurality of cameras simultaneously record image data of respective laundry pieces to be gripped. On account thereof, the cameras always provide exploitable image data of the relevant laundry piece even when one camera is momentarily obscured, for example, or is defective or the viewing direction of a camera is not directed toward the face of the laundry piece. Image data of the laundry piece can always be generated by virtue of the plurality of cameras, said image data enabling a handling installation to automatically grip the laundry piece in a reliable manner.

16 Claims, 5 Drawing Sheets

(56) References Cited

U.S. PATENT DOCUMENTS

| | | | |
|---|---|---|---|
| 2013/0249157 A1* | 9/2013 | Endo | B25J 9/026 29/559 |
| 2014/0081458 A1* | 3/2014 | Shimono | H01L 21/6838 700/259 |
| 2018/0163342 A1 | 6/2018 | Kitagawa | |
| 2018/0222052 A1* | 8/2018 | Vu | G01S 17/87 |

FOREIGN PATENT DOCUMENTS

| | | | |
|---|---|---|---|
| DE | 102017005954 A1 | 12/2018 | |
| EP | 3029195 A1 * | 6/2016 | B65G 47/90 |
| EP | 3029195 A1 | 6/2016 | |
| JP | 2010273732 A | 12/2010 | |
| WO | 2021001039 A1 | 1/2021 | |
| WO | 2021034190 A1 | 2/2021 | |

OTHER PUBLICATIONS

European Patent Office, Europaischer Recherchenbericht (search in a related application), Jul. 20, 2021.

\* cited by examiner

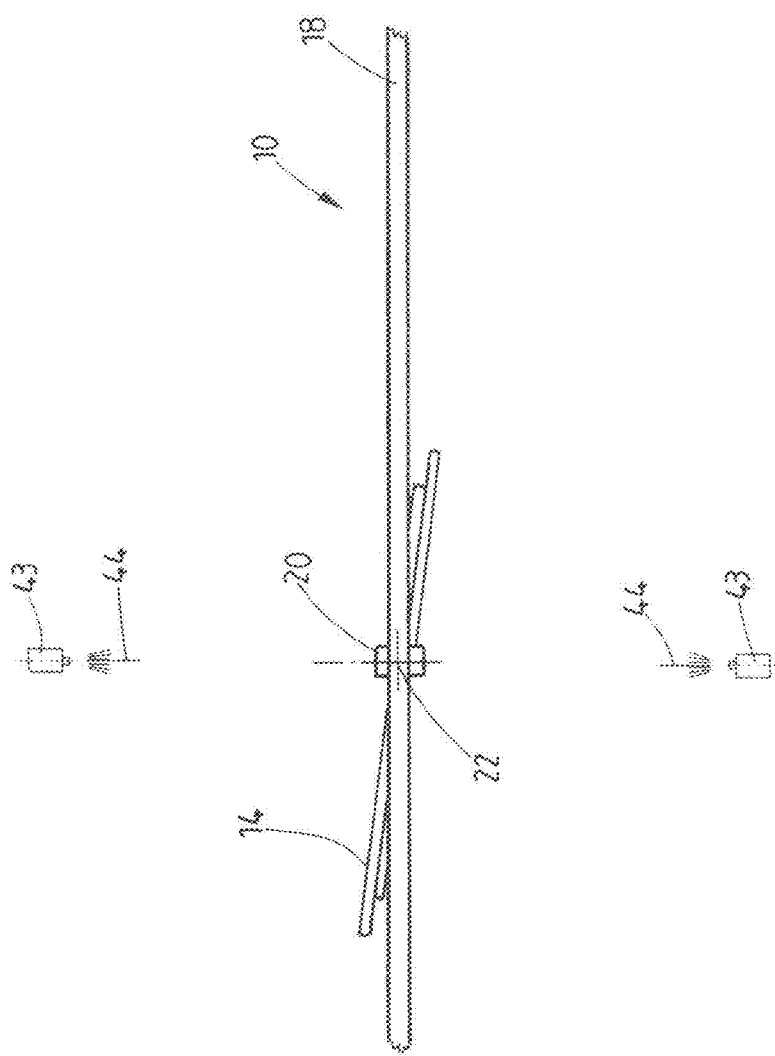

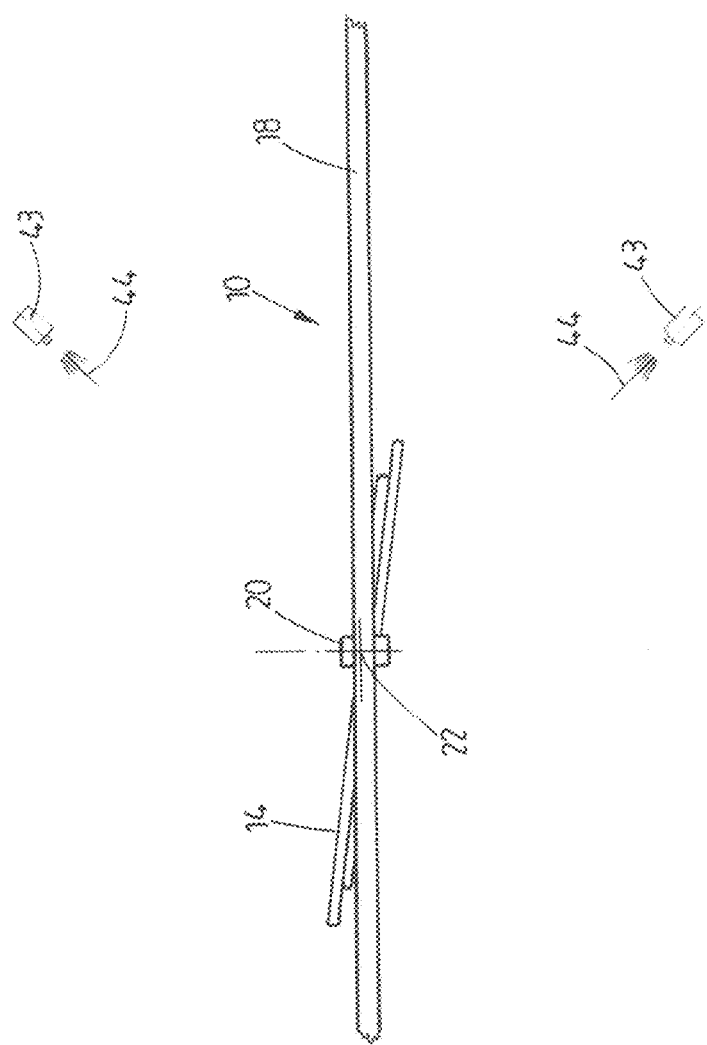

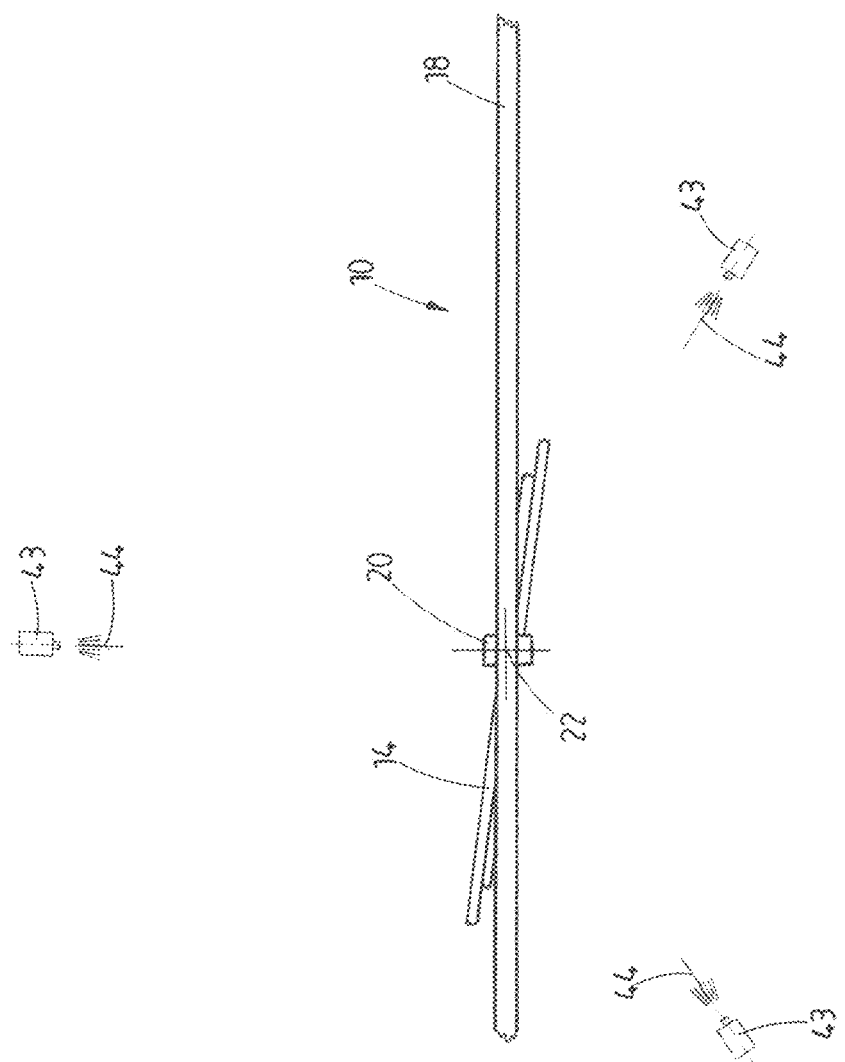

METHOD FOR GRIPPING TEXTILE ITEMS

CROSS REFERENCE TO RELATED APPLICATIONS

This application claims priority on and the benefit of German Patent Application No. 10 2020 001 961.7 having a filing date of 27 Mar. 2020.

BACKGROUND OF THE INVENTION

Technical Field

The invention relates to a method for gripping textile items, wherein the textile item suspended from a first location is automatically gripped by a holding means of a handling installation at at least one other location, and wherein the holding means, controlled by data of at least one image-generating installation that records the other location to be gripped by the holding means, is automatically moved up to the at least one other location.

Prior Art

Efforts are being made toward increased automation in the procedures in laundries. This necessitates that the textile items, above all flatwork, to be treated in laundries, are/is automatically gripped.

From DE 10 2017 005 954 A1 it is known for the respective textile item suspended from a first location to be automatically gripped at a second location. This second location is gripped by a holding means of a handling installation which is controlled by data of an image-generating installation. Textile items are suspended from the first location in a non-controlled manner, in particular so as to be twisted in arbitrary directions. The image-generating installation can therefore not always reliably identify the other location to be gripped by the holding means. On account thereof it can arise that the holding means is controlled by data which do not enable the holding means to automatically grip the desired other, or second, respectively, location in a reliable manner.

BRIEF SUMMARY OF THE INVENTION

Proceeding from the above, the invention is based on the object of achieving an efficient method for automatically gripping textile items in a reliable manner.

A method for achieving this object is a method for gripping a textile item, wherein the textile item suspended from a first location is automatically gripped by a holding means of a handling installation at at least one other location, and wherein the holding means, controlled by data of at least one image-generating installation that records the other location to be gripped by the holding means, is automatically moved up to the at least one other location, wherein the at least one other location is recorded from different viewing directions by at least two image-generating installations, and at least part of the data obtained herein is used for automatically moving the holding means up to at least one other location of the textile item and for gripping the latter. On account of the at least two image-generating installations, the respective textile item, at least in the region of the at least one other location to be gripped, can be visually detected from different directions or viewing angles, respectively. A part of the respective textile item of such large size in which the or each other location is usually situated in all textile items, in particular textile items of dissimilar sizes, that occur is at least detected by each image-generating installation. The visual detection of the respective textile item by the image-generating installations from different viewing angles leads to the at least one other location to be gripped being able to be reliably determined, specifically independently of the relative position in which the textile item is situated in order for the at least one other, or second, lower location of the latter to be visually detected.

The image-generating installations are preferably assigned to the respective textile item, in particular distributed about the textile item, such that the viewing direction or the viewing angle, respectively, of at least one image-generating installation is directed so as to be ideally perpendicular, or with a deviation therefrom of not more than 40°, preferably only 5° to 30°, to the plane of the respective textile item and/or of the at least one other location to be gripped. On account thereof, at least one of the plurality of image-generating installations can detect the other location to be gripped such that the image-generating installation can detect the other location in a planar or almost planar manner, and the holding means by virtue of data, in particular image date, of at least one image-generating installation, can reliably grip the textile item at the at least one other location.

In the case of two preferably identical image-generating installations it is preferably provided that said image-generating installations record the respective other location to be gripped from viewing directions or angles which deviate from one another by 90° to 180°. In this instance, the viewing angles of the two image-generating installations run at a mutual angle of 90° or said viewing angles are mutually opposite. It is moreover conceivable that the image-generating installations are disposed relative to one another such that the viewing angles thereof are mutually offset by more than 90° but less than 180°. By virtue of such relative disposals of the two image-generating installations, the respective other location can be reliably detected, specifically independently of the alignment of the respective textile item. On account thereof, the textile item suspended from the first location may be twisted in an arbitrary manner about a vertical axis, but the other location to be gripped, or the respective other location to be gripped, can nevertheless be reliably detected by at least one of the two image-detecting installation such that meaningful data, above all image data, can be recorded by at least one image-generating installation.

If more than two image-generating installations are provided, the latter are disposed, preferably so as to be uniformly distributed, about the textile item that is suspended from the first corner. On account thereof, three or more than three, preferably identical, image-generating installations can, preferably simultaneously, record a plurality of images of the same textile item. The larger the number of image-generating installations, the greater the probability in this instance that at least one image-generating installation can accurately determine the other location of the textile item to be gripped from an optimal viewing angle. This is the case when the viewing angle of at least one image-generating installation corresponds to the surface normal of the textile item and/or deviates to an ideally minor extent from the surface normal. By determining the at least one location of the textile item to be gripped in an image-generating manner from different viewing angles, data, in particular image data, is obtained from the image-generating installations by means of which data at least the position of the or of each other location to be gripped is able to be determined in particular in a spatial, thus three-dimensional manner, with great accuracy such that the holding means of the handling installation can reliably grip this at least one other location of the textile item without gripping errors arising.

According to one preferred refinement of the method it is provided that the mutually deviating viewing directions or viewing angles, respectively, of all image-generating installations lie in a common plane. This herein is preferably a horizontal plane. In this instance, all axes of the viewing angles of the image-generating installations lie in this plane, albeit in different directions. On account of the viewing directions of the image-generating installations lying in one plane, data, in particular image data, of the textile item can be recorded from different viewing angles. As a consequence of the plurality of image-generating installations, images can thus be recorded from different viewing angles, in particular different sides, or even from all around the textile item.

One further advantageous potential design embodiment of the method provides that the data, in particular image data, of each image-generating installation is evaluated with a view to which image-generating installation has recorded an image of the at least one other location of the textile item to be gripped, the data or image data, respectively, of said image enabling the respective other side to be reliably gripped. It is preferably provided that the items of data of the individual image-generating installations are compared with one another. By evaluating the results of the comparison, in particular by a statistical evaluation, it can then be decided which data or image data, respectively, of which image-generating installation is utilized so as to by virtue of this data determine at least one position of the other location, and by means of this data have the handling installation automatically control the holding means and/or to move the latter to this position.

One advantageous possibility for evaluating the data or image data, respectively, lies in calculating and comparing the areas of the images of the textile item recorded by the image-generating installations. The data or image data, respectively, associated with the largest area is then used for determining the position of the at least one other location and for thus controlling the handling installation such that the holding means assigned to the handling installation travels around the desired location or locations and grips, preferably clamps, the textile item at said location or locations.

The method can be particularly advantageously applied when the first location from which the textile item is suspended is an arbitrary location. It is however advantageous for a corner region, preferably a corner, of the textile item to be used as the first location. This contributes toward the textile item being suspended from the first location such that the at least one other location to be gripped by the holding means is reliably formed at the lower end of the textile item.

Is also advantageous for the other location to be gripped by the holding means to be a lower corner which is situated at a spacing below the first location, or another corner region of the textile item. However, if the holding means is to acquire a textile item not in a punctiform manner at one location but a longer portion of the periphery of the textile item, the other location to be gripped can also be a peripheral portion of the textile item that emanates from the other corner.

Should the textile item be acquired by the holding means at an elongate peripheral portion, in particular a peripheral portion emanating from a corner, of the textile item, the holding means is expediently configured as a double clamp having two clamps or clamp jaws, respectively, that are spaced apart. In this instance, the two clamps of the double clamp of the holding means acquire the peripheral portion at two spaced-apart locations, specifically at opposite ends of said peripheral portion, wherein the peripheral portion is held so as to be rectilinear and/or stretched between spaced-apart clamp jaws of the double clamp. A peripheral portion acquired in such a manner permits a reliable and simple transfer to another holding means, in particular a clamp, of a downstream laundry treatment installation.

BRIEF DESCRIPTION OF THE DRAWINGS

Preferred exemplary embodiments of the method will be explained in more detail hereunder by means of a device which is shown in an exemplary manner in the drawings in which:

FIG. 3 shows a view from above onto the textile item;

FIG. 4 shows a view analogous to that of FIG. 3, according to another exemplary embodiment of the invention; and FIG. 5 shows a view analogous to that of FIG. 3, of a further exemplary embodiment of the invention.

DETAILED DESCRIPTION OF PREFERRED EMBODIMENTS

Figure 1:
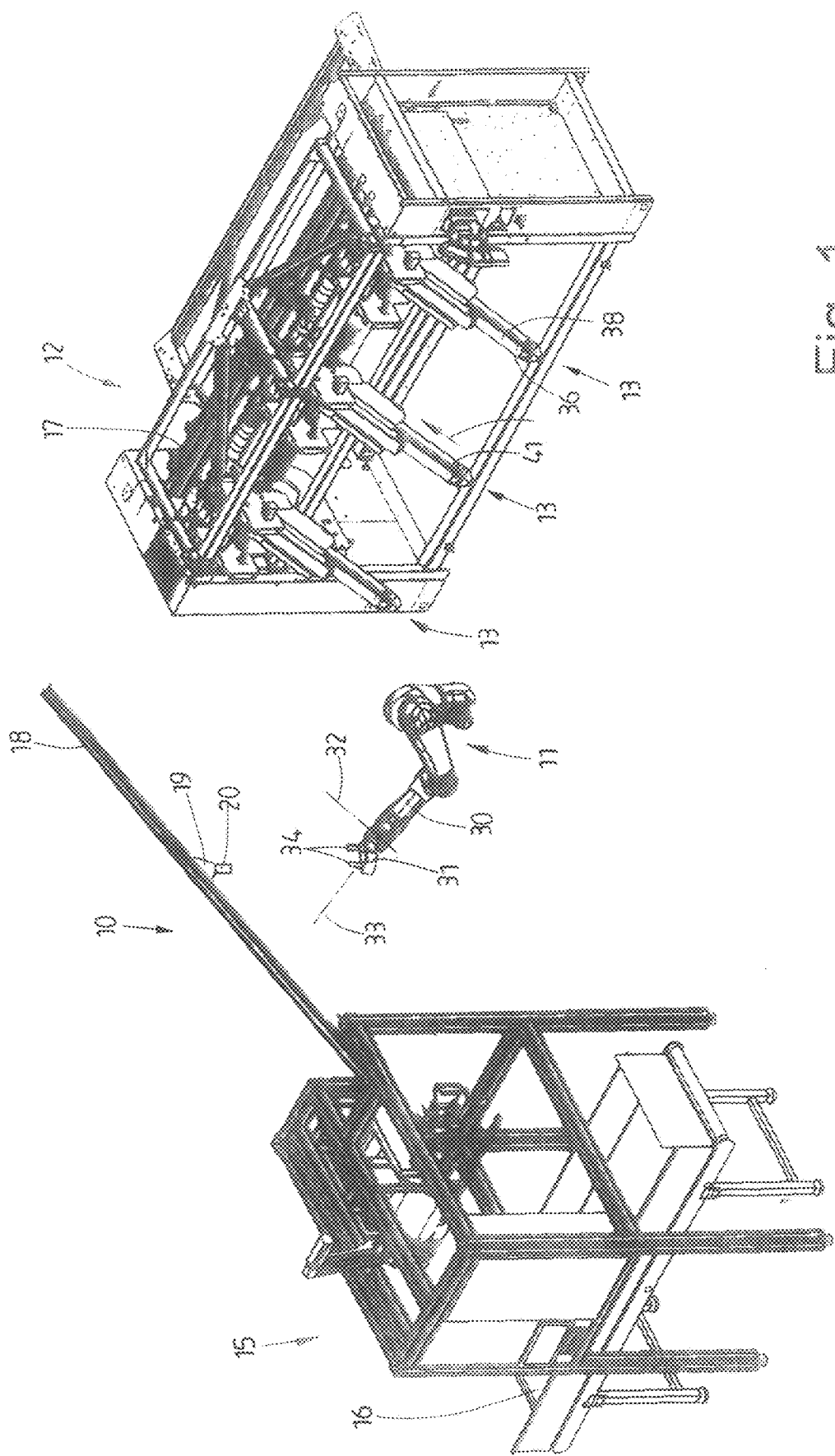
FIG. 1 shows a perspective illustration of the device.

Illustrated in FIG. 1 are a supply conveyor 10, a handling installation 11, and an infeed machine 12 having three loading stations which have in each case one loading conveyor 13. Moreover, FIG. 1 shows a textile item which is suspended from the supply conveyor 10, said textile item in the exemplary embodiment shown being a rectangular laundry piece 14.

FIG. 1 furthermore shows a singularizing installation 15 ahead of the supply conveyor 10. A single laundry piece 14 is in each case transported by the singularizing installation 15 from a conveyor 16 to the singularizing installation 15 and extracted from a laundry batch (not illustrated).

The three loading conveyors 13 which are disposed beside one another at a uniform spacing on the front side of the infeed machine 12 are of identical configuration. Alternatively, more or fewer than three loading conveyors 13, optionally even only a single loading conveyor 13, can also be disposed ahead of the infeed machine 12. The loading conveyors 13, or the at least one loading conveyor 13, can be a component part of another laundry machine, for example a folding machine, or be situated directly ahead of a laundry machine should an infeed machine 12 not be required.

One laundry piece 14 is in each case applied to a spreading installation 17 of the infeed machine 12 by the respective loading conveyor 13, said spreading installation 17 spreading out the laundry piece 14 in a transverse manner. The spread-out laundry piece 14 is then supplied to a supply conveyor of a laundry treatment installation, for example of an ironer or else a folding machine, which is downstream of the infeed machine 12.

The supply conveyor 10 possesses a conveyor rail 18 which in the exemplary embodiment shown is rectilinear and slightly ascending. A clamp carriage 19 having in each case one clamp 20 which is situated below the conveyor rail 18 is displaceable in or on the conveyor rail 18. The clamp 20 of the clamp carriage 19 in the exemplary embodiment shown holds a first corner 21 of the laundry piece 14 at a first location 23. The clamp 20 can however also hold another first location 23, preferably an arbitrary first location 23, of the laundry piece 14. The laundry piece 14 is freely suspended from this corner 21 that is held at the first location 23 by the clamp 20. A vertical central axis 22 which preferably runs through the laundry piece 14 so as to be centric herein extends from the clamp 20 downward.

The clamp carriage 19 is displaceable along the conveyor rail by drives, for example revolving conveyor chains, conveyor belts or the like, that are assigned to the conveyor rail 18.

The supply conveyor 10 can however also be configured differently than described above and shown in the figures, in particular possess another profile. It is decisive that the supply conveyor 10 fulfils the transport task described above.

In terms of the supply direction of the laundry piece 14 to the respective loading conveyor 13, the handling installation 11 is situated between the supply conveyor 10 and the respective loading conveyor 13. Said handling installation 11 is preferably configured as an industrial robot (as illustrated in the figures). The invention is however not limited to a, or a single, industrial robot, respectively.

The handling installation 11 possesses a number of axes which enable the gripper arm 30 thereof that has a free end to move, above all to also rotate and/or to pivot, the laundry piece 14 in the three-dimensional space. A clamp which in the exemplary embodiment shown is a double clamp 31 is disposed on the free end of the gripper arm 30 of the handling installation. In the case of specific gripping tasks it may be sufficient for the clamp to be configured as a simple clamp rather than as a double clamp 31.

The double clamp 31 at the end of the gripper arm 30 of the handling installation 11 is able to be reoriented, for example pivotable about a pivot axis 32 which runs transversely to the longitudinal central axis of the gripper arm 30, and/or rotatable about a rotation axis 33 which runs transversely through the pivot axis 32.

The double clamp 31 possesses two mutually spaced apart, preferably parallel, clamps having in each case one clamp jaw 34. On account thereof, a peripheral portion 35 of an arbitrary periphery, in the exemplary embodiment shown of a lower transversely-directed periphery 26, of the respective laundry piece 14 can be firmly clamped so as to be stretched and thus held between the spaced-apart clamping jaws 34 of the double clamp 31 when the double clamp is closed. In the exemplary embodiment shown, the peripheral portion 35 of the periphery 26 emanates from a preferably free lower corner 24 of the laundry piece 14. The invention is however not limited thereto. The peripheral portion 35 may also be situated between neighbouring corners of the periphery 26 of the laundry piece 14 or of another periphery, for example a lateral periphery.

The handling installation 11 which in the exemplary embodiment illustrated is configured as an industrial robot is rotatable or profitable about so many axes, this including the rotatability and/or the pivotability of the double clamp 31 at the free end of the gripper arm 30, so as to be able to automatically grip the laundry piece 14 from the double clamp 31 and to be able to move the laundry piece 14 from the supply conveyor 10 to a transfer position on the respective available or provided, respectively, free loading conveyors 13, and to transfer said laundry piece 14 to the desired loading conveyor 13.

Each of the loading conveyors 13 of identical configuration possesses a lower, longer conveyor belt 36 that is able to be driven in a revolving manner, and an upper, shorter conveyor belt 38 that is partially disposed above the upper lead 37 of the conveyor belt 36. The upper conveyor belt 38 in relation to the beginning of the lower conveyor belt 36 is offset to the rear in the conveying direction, in order to form a placement region 41. The respective laundry piece 14 by way of a leading peripheral portion 35 can be placed onto this placing region 41 by the handling installation 11 such that the periphery 26 is able to be placed in a U-shaped manner onto the placement region 41 of the respective loading conveyor 13 by the double clamp 31 of the handling installation 11.

Other supply installations which transport the laundry piece 14 to the spreading installation 17 of the infeed machine 12 can also be provided instead of the loading conveyor 13 or the loading conveyors 13, respectively. It is also conceivable for the laundry piece 14 to be fed directly into the spreading installation 17 of the infeed machine 12 by the handling installation 11. Finally, it is also conceivable for the respective laundry piece 14 to be automatically transferred to another conveyor by the handling installation 11, said other conveyor being disposed ahead of the infeed machine 12 or another laundry treatment installation. This conveyor may replace the loading conveyors 13, or transport the laundry piece 14 to the at least one loading conveyor 13.

Figure 2:
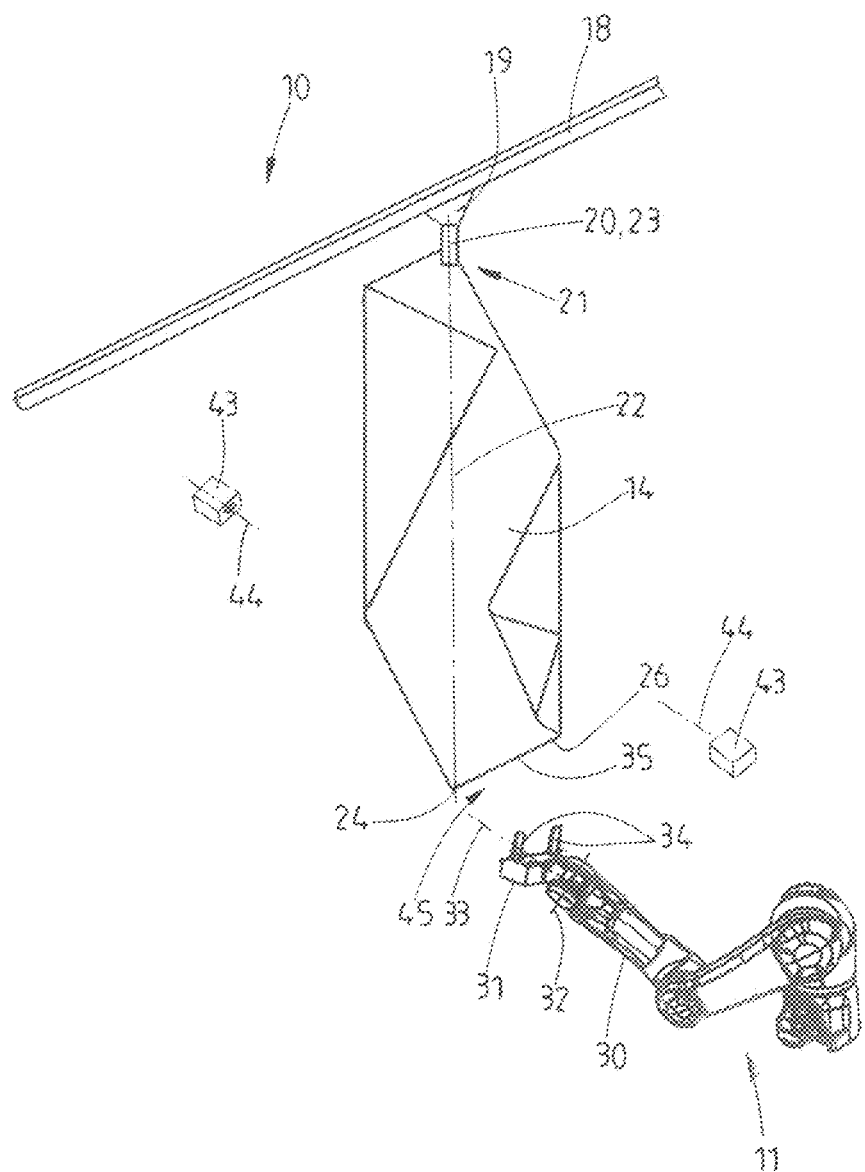
FIG. 2 shows an enlarged detail from the illustration in FIG. 1 in the region of a suspended textile item.

According to the illustrations of FIGS. 2 to 4, two, in particular identical, preferably digital, image-generating installations are assigned to the laundry piece 14 that is suspended from the clamp 20. The image-generating installations are preferably cameras 43, above all digital cameras. These can be cameras 43 which record a two-dimensional or else three-dimensional image. Black-and-white cameras as well as color cameras (should the application require them) may be considered as cameras 43. Optical axes of the cameras 43 correspond to the viewing direction 44 of the respective camera.

The cameras 43 are disposed at different locations beside the laundry piece 14. On account thereof, cameras 43 having different viewing directions 44 are directed toward the laundry piece 14. The disposal of the cameras 43 herein preferably takes place such that the viewing directions 44 are directed directly toward, or at least approximately toward, the vertical central axis 22 of the laundry piece 14.

Furthermore, the cameras 42 are assigned to the laundry piece 14 that is suspended from the clamp 20 and are provided with such optics that each camera 43 visually records at least a lower part of the laundry piece 14 and can generate an image of the latter. This lower region of the laundry piece 14 is chosen such that the image recorded by the respective camera 43 has a size which ensures that the lower, other location 45 of all of the laundry pieces 14, thus laundry pieces 14 of different sizes, to be gripped by the handling installation 11, can be detected.

The other lower location 45 of the laundry piece 14 to be acquired in the exemplary embodiment is the peripheral portion 35 of the laundry piece 14 that emanates from the lower free corner 24. Even when the peripheral portion 35 in the exemplary embodiment shown is gripped by a double clamp 31 having two spaced-apart clamping jaws 34, this hereunder for reasons of simplicity will also referred to as another location 45 despite the double clamp 31 actually gripping the peripheral portion 35 of the laundry piece 14 at both ends thereof at two spaced-apart albeit associated locations. Therefore, the term of the other location 45 used here is not to be understood as gripping the laundry piece 41 at only a single location; this rather also includes the gripping of the laundry piece 14 by the double clamp 31 at two spaced-apart albeit associated locations.

The exemplary embodiment of FIGS. 2 and 3 shows two mutually opposite, preferably digital, cameras 43 on opposite sides of the laundry piece 14. The optical axis of each of the two cameras 43 that corresponds to the viewing direction 44 lies on a common imaginary line. This line preferably runs horizontally even when this cannot be seen in the illustration of FIG. 2 because the latter is a perspective illustration. In this instance, the optical axes of the two cameras 43 lie in a common horizontal plane which preferably intersects the central axis 22 of the suspended laundry piece 14 in a perpendicular manner. It is however also conceivable for the optical axes of the cameras 43 to lie in a common plane which does not intersect the central axis 22 at a right angle but an obtuse angle.

The exemplary embodiment of FIG. 4 likewise shows two digital cameras 43 which are preferably of identical configuration. Deviating from the exemplary embodiments of FIGS. 2 and 3, these two cameras 43 are however not disposed so as to be mutually opposite, specifically so as to be mutually offset by 180° when viewed from above, but so as to be offset by only 90°. The viewing directions 44 which correspond to the optical axes of the two cameras 43 herein run at a right angle in relation to one another. The viewing directions 44 here also intersect the central axes 22 of the laundry piece 14 but may also lie slightly beside said central axis 22. Moreover, the viewing directions 44 which are mutually offset by 90° lie in a common plane which preferably intersects the central axis 22 of the suspended laundry piece 14 in a perpendicular manner. Alternatively, it is also conceivable for the two cameras 43 to be mutually disposed at an angle which is more than 90° and less than 180°, for example is 120° or 160°.

FIG. 5 shows an exemplary embodiment of the device having three, also preferably identical, cameras 43. These three cameras 43 are distributed uniformly about the laundry piece 14. On account thereof, two neighbouring cameras 43 are in each case mutually offset by 120°. Other arrangements are also conceivable, for example arrangements in which the cameras 43 are distributed about the laundry piece 14 so as not to have a uniform offset in relation to one another.

Further exemplary embodiments of the invention which are not shown in the figures are conceivable, in which more than three, preferably digital, cameras 43 are provided, for example four or five cameras 43. These cameras 43 in this instance are likewise distributed about the laundry piece 14, specifically at a uniform mutual offset as well as in a non-uniform arrangement.

The method according to the invention provides that the respective textile item, in the exemplary embodiment shown a laundry piece 14, is automatically gripped. In order for this automatic gripping of the laundry piece 14 to be able to take place rapidly and above all also reliably, a plurality of cameras 43 which record the laundry piece 14 from different viewing directions 44 are provided. The cameras 43 are preferably digital cameras which generate data, above all image data, of the laundry piece 14 or at least a part of the latter in which the other location 45 to be gripped is situated, wherein said data is able to be electronically processed, in particular further processed.

In the exemplary embodiments of the invention shown here it is provided that the cameras 43 conjointly, preferably simultaneously, record, specifically photograph, so to speak, the laundry piece 14, at least in terms of the significant region, from different viewing angles, in particular viewing directions 44. On account thereof, each camera 43 delivers a preferably digital image data set or optionally also in each case a plurality of image data sets. The latter are then processed by a controller of the handling installation 11, or by a computer, such that the handling installation 11 thereafter can approach and grip in a targeted and reliable manner the other location 45 that is to be automatically gripped. The computed data, in particular image data, recorded by the cameras 43 indicate at least the position of the other location 45 or, in the exemplary embodiment described here, the position, at which the two spaced-apart clamping jaws 34 of the double clamp 31 are to grip the peripheral portion 35 of the laundry piece 14. The direction of the peripheral portion 35 can also be determined from the two positions, such that the double clamp 31 is pivotable by the handling installation 11 in such a manner that said double clamp 31 can be moved in parallel from below to the peripheral portion 35 to be acquired.

The method according to the invention enables the accurate determination of the position, of the profile, in particular the inclination and/or optionally the length, of the peripheral portion 35 of the laundry piece 14 suspended from the clamp 20, or alternatively of only a single other location 45 in the case of any arbitrary orientation of the laundry piece 14 suspended from the clamp 20. The laundry piece 14 can in particular be twisted about the vertical central axes 22. Therefore, the laundry piece 14 does not have to be suspended below the conveyor rail 18 as is illustrated in an exemplary manner in FIGS. 2 to 5 in order for the method according to the invention to be carried out.

In order for the quality of the digital images recorded by the cameras 43, and/or the data or image data, respectively, of said images to be improved, it is conceivable for the laundry piece 14 for the digital image capture thereof to be positioned in front of a wall or any other stabilising means, for example a frame, a mesh, or at least one bar.

In the exemplary embodiment of FIG. 3, having mutually opposite cameras 43, the viewing directions thereof being mutually offset by 180°, it is possible for respective other locations 45 of the laundry piece 14 to be recorded at any time and in a reliable manner, for example when a camera 43 is obscured or an item is situated in the field of view of a camera 43 such that no recording of the laundry piece 14 is possible or only a partial recording of the laundry piece 14 is possible. In this instance, the data, in particular image data, recorded by the other unobscured camera 43 can be used in order for the position and the alignment of the peripheral portion 35 of the laundry piece 14 to be computed and for the double clamp 31 to be moved by the handling installation 11 in a targeted and reliable manner, in particular in a positionally accurate manner, to the peripheral portion 35 such that the latter can be precisely acquired by the two clamping jaws 34 of the double clamp 31. The same applies in the case in which only a single other location 45 is to be automatically gripped by a single clamp.

In the two cameras 43 of the exemplary embodiment of FIG. 4 that are offset by 90°, when the viewing direction 44 of a first camera 43 is directed perpendicularly onto the area, specifically the flat side, of the laundry piece 14 and the second camera 43 is directed perpendicularly onto a narrow side of the laundry piece 14, on account of which this camera 43 not being able to record any image of the flat side of the laundry piece 14 or at least a part of said flat side, the first camera 43 can supply an image having exploitable darter of the flat side of the laundry piece 14.

In other cases in which the viewing direction 44 of both cameras 43 runs at an angle between 0° and 90° in relation to the flat side of the washing piece 14 suspended from the clamp 20, both cameras 43 record dissimilarly large areas of the laundry piece 14, specifically except in the case in which the viewing directions 44 of both cameras 43 run at 45° in relation to the flat side of the laundry piece 14. In this instance, both cameras 43 record areas of the laundry piece 14 that are of approximately identical size.

When both cameras 43 supply data, in particular image data, the evaluation of which results in dissimilarly sized areas of the laundry piece 14, this means that the viewing directions 44 of both cameras 43 impacts the area of the laundry piece 14 at different angles. It can then be computed from the deviations of the areas at which angle the viewing direction 44 of the respective camera 43 impacts the area of the laundry piece 14. The true area of the laundry piece 14 can then be computed therefrom, the position of the peripheral portion 35, the inclination and/or the length thereof then being able to be determined therefrom. When both viewing directions 45 impact the area of the laundry piece 14 at 45°, the areas are of identical size such that a direction of the laundry piece in relation to the respective camera 43 of 45° can be derived. When a camera 43 records an image of which the area is practically almost "0", this means that the viewing direction 44 of this camera 43 runs in the direction of the narrow side of the laundry piece 14. The image which the other camera 43 has recorded from the laundry piece 14 in this instance reflects the exact area of the laundry piece 14, specifically of the flat side of the latter. The image data of this camera 14 is then able to be exploited without any conversion in order for the position, the orientation and/or the length of the peripheral portion 35 to be determined.

An approach analogous to the above description for two cameras 43 which according to FIG. 4 are mutually offset by 90° is taken when three cameras 43 are present according to the exempt embodiment of FIG. 5. On account of these three cameras 44 being distributed about the laundry piece 14, and on account of the known angles between the individual cameras 14 that are preferably identical and therefore 120°, the size and/or area of the flat side of the laundry piece 14 can be reliably and precisely detected in any arbitrary orientation of the laundry piece 14, and the position, the orientation and optionally the length of the peripheral portion 35 determined on account thereof. As a consequence of the three cameras 43, the determination of the position, the inclination and/or the length of the peripheral portion 35 is however more accurate. In the exemplary embodiment of FIG. 5, having three preferably identical cameras 43, two cameras 43 which record an exploitable image of the laundry piece 14 are always available when the viewing direction 44 of the third camera 43 is directed toward the narrow side of the laundry piece 14.

The invention is not only suitable for the device shown in the figures. The invention is also suitable for other devices in laundries in which laundry pieces have to be automatically gripped in a reliable manner. This is not only the case in the device shown in the figures, in which the laundry piece 10 is automatically gripped by the infeed machine 12. The automatic gripping of laundry pieces 14 that takes place as per the method according to the invention can also be used ahead of other laundry machines, for example folding machines, or else for sorting procedures and/or checking procedures, for example when dirty laundry has to be examined for foreign matter.

LIST OF REFERENCE SIGNS

10 Supply conveyor
11 Handling installation
12 Infeed machine
13 Loading conveyor
14 Laundry piece
15 Singularizing installation
16 Conveyor
17 Spreading installation
18 Conveyor rail
19 Clamp carriage
20 Clamp
21 Corner
22 Central axis
23 First location
24 Free corner
26 Periphery
30 Gripper arm
31 Double clamp
32 Pivot axis
33 Rotation axis
34 Clamp jaw
35 Peripheral portion
36 Conveyor belt
38 Conveyor belt
41 Placing region
43 Camera
44 Viewing direction
45 Other location

What is claimed is:

1. A method for gripping a textile item, comprising the steps of:
    suspending the textile item from a first location (23) and automatically gripping the textile item by a holding means of a handling installation (11) at at least one other location (45);
    automatically moving the holding means of the handling installation (11), controlled by data of at least one image-generating installation that records the other location (45) to be gripped by the holding means, up to the at least one other location (45);
    recording the at least one other location (45) from different viewing directions (44) by at least two image-generating installations;
    evaluating the results of a comparison of the data of the individual image-generating installations with each other to decide which data from which imaging-generating installation is to be utilized in order to determine at least one position of the at least one other location on the basis of this data; and
    using at least part of the data obtained from the individual image-generating installations for automatically moving the holding means of the handling installation (11) up to the at least one other location (45) of the textile item and for gripping the textile item at the at least one other location (45).

2. The method as claimed in claim 1, wherein the at least two image-generating installations are disposed relative to one another in such a manner that the viewing direction (44) of at least one of the image-generating installations is directed toward the at least one other location (45).

3. The method as claimed in claim 1, wherein the image-generating installations are disposed relative to one another so as to be distributed about the textile item in such a manner that the viewing direction (44) of at least one of the image-generating installations is directed toward the at least one other location (45).

4. The method as claimed in claim 1, wherein the at least one other location (45) to be gripped is recorded by two image-generating installations from viewing directions (44) which differ from one another by 90° to 180°.

5. The method as claimed in claim 1, wherein the at least one other location (45) to be gripped of the textile item is recorded by more than two image-generating installations from different viewing directions (44) which in terms of the angle of the viewing directions (44) of neighboring image-generating installations differ from one another by 360° divided by the number of image-generating installations.

6. The method as claimed in claim 1, wherein the viewing directions (44) of all image-generating installations lie in a common plane.

7. The method as claimed in claim 1, wherein the viewing directions (44) of all image-generating installations lie in a common horizontal plane.

8. The method as claimed in claim 1, wherein the data of each image-generating installation is evaluated with a view to which image-generating installation has recorded unobscured data from the at least one other location (45) to be gripped.

9. The method as claimed in claim 1, wherein the items of data of each image-generating installation are compared with one another with a view to which image-generating installation has recorded data from the at least one other location (45) to be gripped at an ideally right or obtuse angle in relation to the plane or the flat side, respectively, of the textile item.

10. The method as claimed in claim 1, wherein, in the case of data being recorded by a plurality of the at least two image-generating installations, a comparison of data takes place.

11. The method as claimed in claim 1, wherein, in the case of data being recorded by a plurality of the at least two image-generating installations, a comparison of the area of the textile item determined from the data takes place based on the images of the same textile item recorded by the plurality of the at least two image-generating installations, and the data of that image-generating installation that has detected the largest area of the textile item is utilized for automatically gripping the textile item.

12. The method as claimed in claim 1, wherein an arbitrary location (23) of the textile item is used as the first location (23).

13. The method as claimed in claim 1, wherein a corner region or a corner of the textile item is used as the first location (23).

14. The method as claimed in claim 12, wherein another corner region which is situated at a spacing below the first location (23) of the textile item, another corner, or a peripheral portion (35) of the textile item that emanates from the other corner is used as at least one other location (45).

15. The method as claimed in claim 14, wherein the peripheral portion (35) of the textile item is gripped by a double clamp (31) of the holding means.

16. The method as claimed in claim 15, wherein the peripheral portion (35) of the textile item that is gripped by the double clamp (31) is able to be moved in space by the handling installation (11).

* * * * *